United States Patent [19]

Bailey, III et al.

[11] 4,007,004
[45] Feb. 8, 1977

[54] DYESTUFF FILLER DERIVED FROM KRAFT BLACK LIQUOR

[75] Inventors: Carl W. Bailey, III, Isle of Palms; Peter Dilling, Charleston, both of S.C.

[73] Assignee: Westvaco Corporation, New York, N.Y.

[22] Filed: July 5, 1974

[21] Appl. No.: 485,787

[52] U.S. Cl. .......................................... 8/83; 8/79; 8/173; 252/353; 260/124 R; 260/124 A
[51] Int. Cl.$^2$ ..................... C09B 67/00; C07G 1/08
[58] Field of Search ....... 260/124 A, 124 R, 124 C, 260/209; 8/83, 79, 91; 252/353, 354

[56] References Cited
UNITED STATES PATENTS

| | | | |
|---|---|---|---|
| 2,729,534 | 1/1956 | Ehrensperger | 8/94.31 |
| 3,156,520 | 11/1964 | Blaisdell | 8/91 |
| 3,726,850 | 4/1973 | Detroit | 252/353 X |
| 3,763,139 | 10/1973 | Falkehag | 260/124 R |
| 3,769,272 | 10/1973 | Hintz | 252/353 X |
| 3,864,276 | 2/1975 | Benko | 252/353 X |

*Primary Examiner*—Leland A. Sebastian
*Attorney, Agent, or Firm*—Richard L. Schmalz; Ernest B. Lipscomb, III

[57] ABSTRACT

A dyestuff filler material with humectant properties derived from kraft black liquor is disclosed. The process for obtaining the dyestuff filler material involves the acidification of kraft black liquor followed by separation of the precipitated portion, such as by filtration. The filtrate from this separation is then treated to solubilize the remaining portion of lignin, which primarily is low molecular weight lignin. This step is followed by a stabilization step, for example, with air to oxidize the filler material to minimize azo dye reduction.

9 Claims, No Drawings

DYESTUFF FILLER DERIVED FROM KRAFT BLACK LIQUOR

BACKGROUND OF THE INVENTION

1. Field of the invention

This invention relates to the production of a filler material for dyestuff compositions. More particularly, this invention relates to a process for treating kraft black liquor to remove a substantial amount of the lignin portion and to stabilize the material against fiber staining and dye reduction to thus make it suitable as a filler material in dyestuff compositions.

2. The Prior Art

Dyestuff compositions, for the most part, the dye cake, i.e., a dispersed dye or a vat dye, a dispersant, and a "filler" or, as it is sometimes called, a diluent. Fillers are basically ingredients to dilute a milled dyestuff composition to a certain color value or dye strength which is accepted by the industry as a standard and which do not interfere with the dispersion phenomona of the product in use. The filler, in addition to being inexpensive, may assist the dispersant by serving as a humectant and providing redispersibility. The filler should also be low in foaming, low in fiber staining, and should not be detrimental to the heat stability of the dispersed dyestuffs. In addition, it is desirable that the fillers do not form thixotropic mixtures or contribute to the overall viscosity. When used with azo-type dyes, the filler must also not have a tendency to reduce the diazo dye linkage. The disperse and vat dyestuff compositions are widely used to color both natural and synthetic fibers; and when used with fillers, the fillers may be added to a dye bath.

As stated, because in many instances large amounts of filler are used, it is essential that the filler, in addition to having the desired properties, be relatively inexpensive. Thus, attempts in the prior art have been made to provide fillers from numerous sources. One of the sources which has been investigated for obtaining dyestuff fillers is a product obtained from the spent liquor resulting from the sulfite pulping of wood as disclosed in U.S. Pat. No. 3,156,520 to Blaisdell. However, as will be shown hereinafter, the products of the claimed invention as modified exhibit certain advantages over those disclosed in Blaisdell.

It is thus the general object of this invention to provide a filler material from kraft black liquor for use with dyestuff compositions.

Another object of this invention is to provide a filler material obtained from the filtrate of kraft black liquor.

An even further object of this invention is to provide a process for treating kraft black liquor to render it suitable for use as a filler for dyestuff compositions.

Yet another object of this invention is to provide a filler material for use with disperse dyes or vat dyes having humectant properties.

Still another object of this invention is to provide a filler material from kraft black liquor which has been sulfonated and air oxidized to provide a stable dyestuff composition filler.

Other objects, features and advantages of this invention will be evident from the foregoing detailed description.

SUMMARY OF THE INVENTION

It has been found that dyestuff compositions having improved properties are obtained by incorporation therein of a filler material derived from the black liquor resulting from the kraft process for obtaining cellulose pulp. This filler material may be used with the dyestuff in combination with dispersants. The process for treating the kraft black liquor is to acidify the black liquor to precipitate the major lignin fraction and separate the precipitated lignin fraction and use the filtrate. The filtrate is treated with an agent to solubilize the low molecular weight lignin fraction and then stabilize the filtrate filler material to minimize azo dye reduction.

DETAILED DESCRIPTION OF THE INVENTION

Black liquor, as obtained from the kraft wood pulping process, contains substantial amounts of lignin, wood sugars, and some other materials. The relative amounts of these materials are shown in Table I which gives a typical analysis of the major components present in the black liquor.

TABLE I

|  | KRAFT BLACK LIQUOR Lbs./1000 Lb. Solid | % of Total, Solids |
| --- | --- | --- |
| Inorganic Components | 113 | 11.3 |
| Lignin | 301 | 33.6 |
| Na Associated with Lignin | 35 | (61 No, as NaOH) |
| Saccharinic Acids & Low Mol. Wt. Organic Acids | 443 | 55.1 |
| Na Associated with Saccharinic Acids & Low Mol. Wt. Acids | 108 | (187 No., as NaOH) |

The inorganic components are primarily sodium carbonate, sodium sulfate and sodium hydrosulfite.

The filler material of this invention which is obtained from the black liquor contains an alkali metal salt of a complex mixture of wood sugars, i.e., primarily saccharinic acids, low molecular weight acids and the free wood sugar acids themselves. The filler material may also contain a minor, usually less than 10%, portion of solubilized lignin.

The first step in the process of obtaining the filler material is the removal of the major lignin portion from the kraft black liquor. The black liquor solids, as obtained from the kraft process, are at a pH of 12 to 14, typically a pH of 12.5 to 13.5. The kraft black liquor is acidified to a pH of approximately 9.0 to 10 with an acidifying agent, such as sulfuric acid, carbon dioxide or sulfur dioxide, with sulfur dioxide being preferred. Under such conditions, substantial amounts of lignin and salts are precipitated. The precipitated lignin portion is separated from the black liquor by filtration, centrifugation or other such means; and the filtrate material, which is used in the process of this invention, may appear as shown in Table II for a typical filtrate material acidified with carbon dioxide. When other acidifying agents are used, the filtrate composition will vary slightly but in general will be quite similar.

TABLE II

| | FILTRATE COMPOSITION Lb./1000 Lb. Solids | % of Total, Solids |
|---|---|---|
| Inorganic Components | 221 | 22.1 |
| Lignin | 58 | 6.3 |
| Na Associated with Lignin | 5 | |
| Saccharinic Acids & Low Mol. Wt. Acids | 576 | 71.6 |
| Na Associated with Saccharinic Acids & Low Mol. Wt. Acids | 140 | |

As can be seen from Table II, the filtrate material in this case is approximately 72% sodium salt of saccharinic acids, free saccharinic acids and other low molecular weight acids.

The precipitated lignin portion resulting from the separated filtrate may, if desired, be washed to reduce the inorganics, etc., present in the precipitated lignin portion. The filtrate from the washing step may in certain cases, if desired, be combined with the original filtrate portion for use in this invention as an alternative embodiment. The resulting filtrate comprising the original filtrate and the wash filtrate is called herein the "combined filtrate" and contains higher amounts of inorganic salt and a higher amount of low molecular weight lignin which needs to be solubilized.

The next step is to treat the filtrate material in order to make it into a filler material having desirable properties. This next step is the solubilization of residual primarily low molecular weight lignins to reduce fiber staining to a minimum level. While lignin solubilization may be obtained using such agents as chlorohydroxy propyl sulfonic acid and chloromethane sulfonic acid, sulfonation appears the most attractive, especially from an economic point of view.

Thus, where sulfonation is the desired route for solubilization of residual lignin, it is preferable to precipitate in the first step the lignin from the black liquor with sulfur dioxide as this not only results in a pH lowering, but as well in the generation of sodium sulfite and bisulfite needed for the sulfonation reaction of the residual, low molecular weight lignins. When the filtrate material from the black liquor effluent, whether being combined filtrate or not, is sulfonated, it may be sulfonated by several ways depending upon how the lignin was precipitated. If the lignin was precipitated by use of sulfur dioxide precipitation, then formaldehyde in an amount of 5 to 100 grams per 1,000 grams of filtrate solids is added and the mixture heated to between 60° and 200° C., preferably 95° C. for 0.5 to 6 hours. When the filtrate has been precipitated by means other than sulfur dioxide, then a stoichiometric amount of sodium sulfite is added either alone or along with the formaldehyde; and the same reaction conditions are used. However, it has been found that acid precipitation with sulfuric acid or sulfur dioxide is the preferred route, as the resulting filler material is superior in regard to fiber staining than when using other precipitating agents.

When the lignin solubilizing agent is chlorohydroxy propyl sulfonic acid or chloromethane sulfonic acid, from 5 to 100 grams per 1,000 grams of filtrate solids are added. These solubilizing agents and filtrate mixture are heated to between 40° and 200° C. for 0.5 to 24 hours to affect the solubilization.

The third step of the process to obtain a filler material having the desired properties is the stabilization of the filler material to minimize azo dye reduction. The preferred method of stabilizing the filler material is to convert the catecholic structures present in the components of the filler material to their corresponding quinones to minimize azo dye reduction. This conversion may be obtained by oxidizing the filler material after the residual lignins have been solubilized. The preferred way to oxidize is to bubble air through the system at 50° to 100° C., preferably 80° to 90° C., for an additional 1 to 48 hours, preferably 8 to 10 hours. The applied air flow may be from about 0.05 to 5.0 cubic feet per hour for a 100 milliliter sample. Toward the end of this reaction step, water is allowed to evaporate until a solids concentration of approximately 50% is obtained. Other means of oxidizing the filler material include the use of hydrogen peroxide or oxygen. When oxygen is the oxidizing agent, it is added to the filtrate filler at from 10 to 250 p.s.i. in an autoclave and heated at 50° to 200° C. for 0.5 to 10 hours.

An alternative means of stabilizing the filler material to reduce or prevent azo dye reduction is to block the hydroxyl groups of the catecholic structures present in the components of the filler material using such blocking agents as epichlorohydrin or cyanuric chloride. These blocking agents are used in an amount of 0.5 mole to 10 moles of blocking agent per 1,000 grams of lignin. The stabilization is carried out at from 70° to 140° C., preferably 90° to 110° C. for 0.25 hour to 10 hours.

In an alternative embodiment, the reaction sequences of sulfonation and air oxidation may be carried out simultaneously with substantially improved results in azo dye stability but with not quite as effective results as achieved by first sulfonating followed by air oxidation or blocking. It is believed that carrying out the steps simultaneously results in inadequate low molecular weight lignin solubilization which may explain the slightly inferior staining properties obtained.

It is desirable to lower the final pH of the filler material to pH 7–8 to be more compatible with other ingredients of the dyestuff formulation. The use of such acids as phosphoric, boric, sulfuric, hydrochloric and acetic, with acetic being especially preferred, are used for the final pH adjustment from approximately 10.5 to 7.5. When the combined filtrate is used to make the filler material, virtually no crystalization of inorganic salts at pH 7 to 8 is detected during short storage times; and during extended storage times, only small residues result. Nevertheless, good sample fluidity at freezing conditions (−10° to −15° C.) can be maintained upon a 5 to 10% ethylene glycol addition (amounts based on the total solids content).

The filler material in solution can be concentrated at pH 7.5 as high as 65% without settling or a thixotropic behavior. At lower solids content, some settling at ambient temperature and thickening at freezing conditions is observed. The sulfonated, oxidized filler material may be used as a concentrated aqueous solution, generally at a concentration between 40 and 65% solids; or the filler may be concentrated and spray dried to yield the solid material.

In instances where the modified black liquor filtrate was added at various levels to a dye formulation consisting of a dye and a dye dispersant, and subsequently spray dried, the products remain as dustless powders even at high filtrate loadings. This makes it possible for dye manufacturers to store, sell and ship dye formulations in powdered form.

As stated, one of the desired properties obtained by the filler of this invention is that it acts as a humectant. A humectant is a substance which holds water and is added to a dye paste to prevent the dye from drying out, for example, on the edges of a drum. Without a humectant, the dry dye material would flake back into the container resulting in a higher local dye concentration. The uneven distribution of color bodies subsequently are noticeable in fiber specking.

The filler materials prepared in the above manner from kraft liquor are of unique value as an additive to dyestuff compositions, when used in combination with primary dispersants since they possess an unusual and unexpected combination of properties not otherwise readily obtainable. The filler material acts not only as a diluent but also as a humectant. The amount of filler material used, of course, depends upon the particular dye chosen and the color level desired. The improvements provided when the filler materials of this invention are used as an additive with primary dispersants are that good results are obtained in wetness (humectancy), dusting, fiber staining, azo dye reduction, and foaming properties.

It should be noted that the filtrate from the black liquor incorporates chemicals of annoying smell, mainly consisting of low molecular weight sulfur-containing structures. These structures are hazardous; and without chemically binding them, a severe pollution problem could be caused upon emission. Fortunately, during both modification steps (lignin solubilization and oxidation), these substances are converted in both instances to non-volatile odorless materials.

The test for determining the filterability of a formulated disperse dyestuff is to place 1 gram of solid material into 10 milliliters of water and stir for 60 seconds to obtain a smooth paste. The dyestuff paste is diluted immediately to 250 milliliter volume and stirred for 1 minute. Then the mixture is filtered through a Buchner funnel containing a tared 9.0 centimeter No. 2 and No. 4 Whatman filter paper (with vacuum) and rinsed with 300 milliliters of distilled water. Dyes with good filtration properties should filter completely in 60 seconds and should exhibit approximately equal staining of the No. 2 and No. 4 filter papers. If the filter paper has deposits on it and/or is much darker than the No. 4 filter paper, then the dye is unacceptable.

The test for determining dispersion of a disperse dyestuff is to place 1 gram of solid dye composition into 250 milliliters of water and stir at ambient temperature to the point of complete uniformity. The product then is filtered through a Whatman No. 4 and Whatman No. 2 filter paper. The filter time is then recorded.

The heat stability test is performed by adding 1 gram of solid formulated dye composition to 250 milliliters of water, boiling the solution for 15 minutes and then filtering through a No. 4 Whatman filter paper. The time and filter residue is recorded.

The test for determining the extent of fiber staining caused by the filler is to weigh out 10 grams of the filler material and dissolve in 200 milliliters of tap water and adjust the pH to 7. Add a 5-gram polyester fiber skein and heat to a boil. Boil the mixture for 15 minutes, wash the skein with tap water and dry in an oven at 105° C.

The azo dye reduction test is performed by charging a pressure bomb with a standard diazo disperse dye solution by adding 5 grams of Disperse Brown 1 in a liter of distilled water, 200 milliliters of tap water and dissolve 20 grams of the filler there into. The mixture is thoroughly stirred, and 25 milliliters of the standard dye solution mentioned above are then added along with a 5-gram polyester fiber skein; and the entire mixture is brought to a volume of 250 milliliters with tap water. The bomb and contents are then placed in an oven at 130° C. for 1 hour under constant rotation. After cooling, the skein is removed from the bomb, washed and dried. The reduction in color is compared by visual observation but, if desired, be determined by analysis of the residual solution with a spectrophotometer.

The test for determining foaming properties was to weigh out 1 gram of filler and dissolve in 100 milliliters of tap water. Adjust to pH 8.0 with acetic acid and pour into a 250 milliliter graduated cylinder. Rapidly invert 5 times and measure the height of the foam in milliliters immediately after completing the inversions and again after 1 minute and 2 minutes have elapsed. Return the solution after all the foam has broken (or 2 minutes) and lower the pH to 5.0 with acetic acid and again perform the inversion and recording part of the test.

The following examples will serve to illustrate this invention.

Examples 1 through 5 are to show the use of various lignin solubilizing agents for use in making the filler material. The filtrate used in these examples was obtained by acidifying kraft black liquor with carbon dioxide (Examples 1–3) or sulfur dioxide (Examples 4–5) until the pH was lowered to 9.5 and a portion of the material precipitated. The acidified material was heat coagulated, and the coagulated material was filtered.

EXAMPLE 1

To 100 grams of 48% solids black liquor filtrate ($CO_2$ precipitated) was added 2.2 grams of $Na_2SO_3$, 40 milliliters of water and the pH was adjusted to 11.0. The mixture was placed in an autoclave and heated to 160° C. The temperature was maintained at 160° C. for 6 hours and was then cooled. Air was then bubbled through the reaction mixture at a rate of approximately 0.6 cubic feet per hour under vigorous stirring at a temperature between 85° and 90° C. After 12 hours, the solids were adjusted to 52% and the air flow stopped. Acetic acid was used to adjust the pH to 7.5.

The material was evaluated by adding to a formulated disperse dyestuff and checking for deterioration of dispersion or heat stability characteristics by test procedures set out hereinabove. The filler was found not to be detrimental to dispersion or heat stability. The material was also found to have virtually no fiber staining characteristics and no azo dye reducing properties.

A diazo disperse dye solution was prepared by mixing 15 grams of Disperse Brown 1 in 50 milliliters of distilled water along with 15 grams of a modified alkali lignin dye dispersant, Reax 85A from Westvaco Corporation and 5 drops of E.D.T.A. (1% solids at pH approximately 10–10.5) and was adjusted to pH 7.5 with acetic acid. The dyestuff composition was ground in a sand mill until the point where the filter test for disperse dyes was passed. A filler material made as outlined above was added to the disperse dye solution and passed through the sand mill. Heat stability, foaming, dispersing ability, fiber staining and diazo dye reduction properties were determined and compared to a commercially available filler.

The procedure for determining each property is set out hereinabove. The results are shown in Table IV hereafter.

EXAMPLE 2

A portion of the filtrate (100 grams at 48% solids) was added to 150 milliliters of water. The pH was then adjusted to 11.5 after which chlorohydroxy propane sulfonate was added to the mixture and the mixture heated to approximately 60° C. and maintained at that temperature for 5 hours. In this example, various amounts of the lignin solubilizing chlorohydroxy propane sulfonate were added to different portions of the filtrate in an amount ranging from 1 mole of chlorohydroxy propane sulfonate to 3 moles of chlorohydroxy propane sulfonate. The fiber staining and azo dye reduction test results are shown in Table IV.

EXAMPLE 3

To another portion of a 100-gram portion of the filtrate, the 100 grams of filtrate was diluted with 60 milliliters of water; and subsequently, the pH was adjusted to 11.0. To this, a 5-mole addition of chloromethane sulfonic acid per 100 grams of residual estimated lignin content was added; and the composition was spray dried and heated to 130° C. for 2 hours. The fiber staining and azo dye reduction test results are shown in Table IV.

EXAMPLE 4

To a heat coagulated filtrate from $SO_2$ precipitate black liquor containing 100 grams of filtrate which was then diluted with 60 grams of water followed by a pH adjustment to 11.5 was added 2.23 grams of $Na_2SO_3$ and 1.28 grams of formaldehyde. The mixture was heated to 70° C. and maintained for 45 minutes, and then heated to 100° C. for an additional 5 hours. The fiber staining and azo dye reduction test results are measured at pH 10 and 9.5 shown in Table IV.

EXAMPLE 5

To 200 grams (32% solids) of black liquor filtrate ($SO_2$ precipitated) was added 58.1 grams of paraformaldehyde. The reaction mixture was readjusted to pH 10 and heated to 100° C. for 3 hours, after which time the temperature was lowered to about 85° C. Air was then bubbled through the reaction mixture at a rate of approximately 0.4 cubic feet per hour under vigorous stirring. After about 9 hours, the temperature was increased to boiling allowing water to evaporate until a 50% solids concentration was obtained. Acetic acid was then added to the filler material until pH 7.5 was reached. The results are shown in Tables III and IV.

TABLE III

| | | Heat Stability Filter Residue grams | Dispersion Filtration Time (Sec.) Whatman No. 4 |
|---|---|---|---|
| 1. | Blank (without Filler) | 0.011 | 10 |
| 2. | Commercial Filler[a] | 0.004 | 9 |
| 3. | Invention Filler | 0.001 | 9 |

| | | Foam Height, (ml.) | | | |
|---|---|---|---|---|---|
| | Foaming Test | Initial | Min. | 2 Min. | pH |
| 2. | Commercial Filler[a] | 160/150 | 108/114 | broke/108 | 8/5 |
| 3. | Invention | 150/150 | 125/145 | 115/130 | 8/5 |
| 4. | Invention + 5% Ethylene Glycol | 140/155 | 106/116 | broke/108 | 8/5 |

Note:
Maracarb NI made by American Can Co.

In addition to the results shown above, the filler possessed good filterability, no fiber staining and low azo dye reduction properties.

TABLE IV

| | FIBER STAINING AND AZO DYE REDUCING PROPERTIES OF FILTRATES HAVING SOLUBILIZED LIGNINS | |
|---|---|---|
| TYPE OF MATERIAL | FIBER STAINING | AZO DYE REDUCTION |
| Filtrate without Modification | Bad | Bad |
| Filtrate (Lignin Removed) | Good | Bad |
| Filler from Example 1 | Good | Good |
| Filtrate from Example 2 | Excellent | Fair |
| Filtrate from Example 3 | Good | Fair |
| Filtrate from Example 4 (pH 10) | Excellent | Bad |
| Filtrate from Example 4 (pH 9.5) | Good | — |
| Filtrate from Example 5 | Excellent | Good |
| Filler from Example 5 Using a "combined filtrate" | Very Good | Good |

Examples 6 through 9 show the stabilization by oxidizing and blocking of a filtrate material from Example 4.

EXAMPLE 6

Samples of 500 grams of filtrate from Example 4, having a solids content of 32.5% (162.5 grams of solid material) were treated with $H_2O_2$ at pH 9.8. Upon the addition of hydrogen peroxide (30%), an exothermal reaction was observed and external cooling was applied in cases of temperature rises above 30° C. The following mixtures were reacted for 19 hours at ambient temperature and 3 hours at 50° C.
 a. 3.0% $H_2O_2$ (30%) = 4.88 grams/162.5 grams solids.
 b. 10.0% $H_2O_2$ (30%) = 16.25 grams/162.5 grams solids.

The fiber staining and azo dye test results are shown in Table VII.

EXAMPLE 7

This example illustrates catechol blocking reaction with epichlorohydrin and cyanuric chloride. Five Hundred (500) grams of filtrate material with a solids content of 31.5% (157.5 grams solid material) was pH adjusted to 11.5 and then heated to 100° C. After addition of the blocking agent, the material was allowed to react at 100° C. for 5 hours.

TABLE V

| Blocking | Amount of Reagent (grams) | Moles of Reagent per 1,000 g. of Lignin (a 10% Lignin cont. was assumed) | Solubility |
|---|---|---|---|
| Epichlorohydrin | 2.9 | 2 | Soluble |
| Cyanuric Chloride | 5.81 | 2 | Some Precipitation |
| Epichlorohydrin | 14.56 | 10 | Soluble |
| Cyanuric Chloride | 29.04 | 10 | Heavy Precipitation |
| Cyanuric Chloride | 2.9 | 1 | Soluble |

The fiber staining and azo dye test results are shown in Table VII.

EXAMPLE 8

This example illustrates oxygen treatment of a filtrate material sulfonated according to Example 4 in an autoclave. Several samples of 100 grams each of sulfonated filtrate material (34% solids content) with a pH of 10.7 were transferred into a 2-liter autoclave (rotating digester). One Hundred (100) p.s.i. of oxygen was then injected into each sample. The autoclave was heated to 150° C. and maintained for 2 hours. The initial oxygen pressure was 200 p.s.i.g.

TABLE VI

STABILIZATION OF FILTRATE MATERIAL VIA OXYGEN

| Sample | Starting pH | pH After Reaction | Reaction Time (Hrs.) |
|---|---|---|---|
| 1[a,b] | 10.3 | 9.4 | 2 |
| 2[b] | 12.0 | 9.7 | 6 |
| 3 | 8.9 | 8.6 | 6 |

Notes:
[a]Pressure varied from 305 p.s.i. highest to 160 p.s.i.
[b]Combined Filtrate The test results for fiber staining and azo dye reduction are shown in Table VII.

TABLE VII

STAINING AND AZO DYE REDUCING PROPERTIES OF BLACK LIQUOR FILTRATE AND MODIFIED PRODUCTS

| Type of Material | Fiber Staining | Azo Dye Reduction |
|---|---|---|
| Example 6 | | |
| Filtrate ($SO_2$) - Sulfonated, $H_2O_2$ Oxidized (3%) | Excellent | Very Good-Excellent |
| Filtrate ($SO_2$) - Sulfonated, $H_2O_2$ Oxidized (10%) | Excellent | Very Good-Excellent |
| Example 7 | | |
| Filtrate ($SO_2$) - Sulfonated, Epichlorohydrin Treated (2.9 g. Epi) | Excellent | Very Good |
| Filtrate ($SO_2$) - Sulfonated, Epichlorohydrin Treated (7.25 g. Epi) | Excellent | Excellent (Best Property) |
| Example 8 | | |
| Sample 1 | Very Good-Excellent | Very Good |
| Sample 2 | Good-Very Good | Very Good |
| Sample 3 | Very Good-Excellent | Excellent |

Note:
$SO_2$ = Black Liquor was pH lowered with $SO_2$

EXAMPLE 9

This example is to illustrate the humectant properties of the filler material. Two samples (at pH 7.3 and pH 6.0) of the concentrated filler material from Example 5 were spray dried and heated additionally in an oven until they were completely dry (100%). The samples were weighed, placed in an open tray at 23° C. in a room having a relative humidity of 50%. The samples were allowed to pick up water and at various times the amount of water pick up was determined as shown in Table VIII.

TABLE VIII

| pH of Sample | 3.5 Hrs. | 6 Hrs. | 25 Hrs. | 48 Hrs. | 120 Hrs. |
| --- | --- | --- | --- | --- | --- |
| 7.3 | 9.95% | 18.1% | 28.85% | 29.8% | 28.45% |
| | | 2 Hrs. | 4.75 Hrs. | 24 Hrs. | |
| 6 | | 10.25% | 16.85% | 24.2% | |

While this invention has been described and illustrated with specific examples and descriptions, it is understood that the invention is not to be limited to the exact details of operation or exact components shown and described herein as obvious modifications and equivalents will be apparent to those skilled in the art; and the invention is, therefore, to be limited only by the scope of the appended claims.

What is claimed is:

1. A material made from the process comprising;
   a. acidifying kraft black liquor to pH between 9 and 10 to form a precipitate and a filtrate,
   b. separating said filtrate from said precipitate,
   c. treating said filtrate with a lignin solubilizing agent to solubilize the remaining lignin,
   d. stabilizing said filtrate with a member selected from the group consisting of oxidizing agents and blocking agents, and
   e. evaporating water to obtain a filtrate having a solids content of 40 to 65%.

2. The filler material of claim 1 wherein in step (c) the filtrate is treated with a lignin solubilizing agent selected from the group consisting of chlorohydroxy propyl sulfonic acid, chloromethane sulfonic acid, and sulfonating agents.

3. The filler material of claim 1 wherein the process further comprises, acidifying said kraft black liquor with sulfur dioxide, and treating in step (c) said filtrate with formaldehyde.

4. The filler material of claim 2 wherein in step (c) the filtrate is treated with a sulfonating agent selected from the group consisting of sodium sulfite and sodium bisulfite, and formaldehyde in an amount of 5 to 100 grams per 1,000 grams of filtrate solids at a temperature between 60° and 200° C. for 0.5 to 6 hours.

5. The filler material of claim 1 wherein in step (d) the process further comprises stabilizing with a member selected from the group consisting of oxygen, air, hydrogen peroxide, epichlorohydrin and cyanuric chloride.

6. The filler material of claim 1 wherein in step (d) said stabilizing is accomplished by oxidizing with air at a temperature between 50° and 100° C. for 1 to 48 hours.

7. The filler material of claim 1 wherein the process further comprises, washing the precipitated lignin and combining the washed filtrate with the filtrate of step (b).

8. The filler material of claim 1 wherein the process further comprises, solubilizing lignin and stabilizing simultaneously.

9. A dyestuff composition comprising, a water-dispersible solid dyestuff, a dyestuff dispersant, and the filler material of claim 1.

* * * * *